Nov. 21, 1967 G. M. SMITH ET AL 3,354,270
MAGNETIC ERASE HEAD CURRENT SUPPLY
Filed Oct. 1, 1963

GRANT M. SMITH &
ALLEN J. TROST
INVENTORS

BY Stuart Lubitz
ATTORNEY 3,354,270

MAGNETIC ERASE HEAD CURRENT SUPPLY

Grant M. Smith, Cupertino, and Allen J. Trost, Santa Clara, Calif., assignors to Ampex Corporation, Redwood City, Calif., a corporation of California Filed Oct. 1, 1963, Ser. No. 312,994
1 Claim. (Cl. 179—100.2)

ABSTRACT OF THE DISCLOSURE

Apparatus for supplying current to a magnetic erase head utilizing filter means to eliminate the ripple in an unregulated power supply and a solid state amplifier oscillator means inductively coupled to an erase head circuit means by a step down transformer, wherein the erase head circuit means defines an essentially pure inductance circuit.

Figure 2:
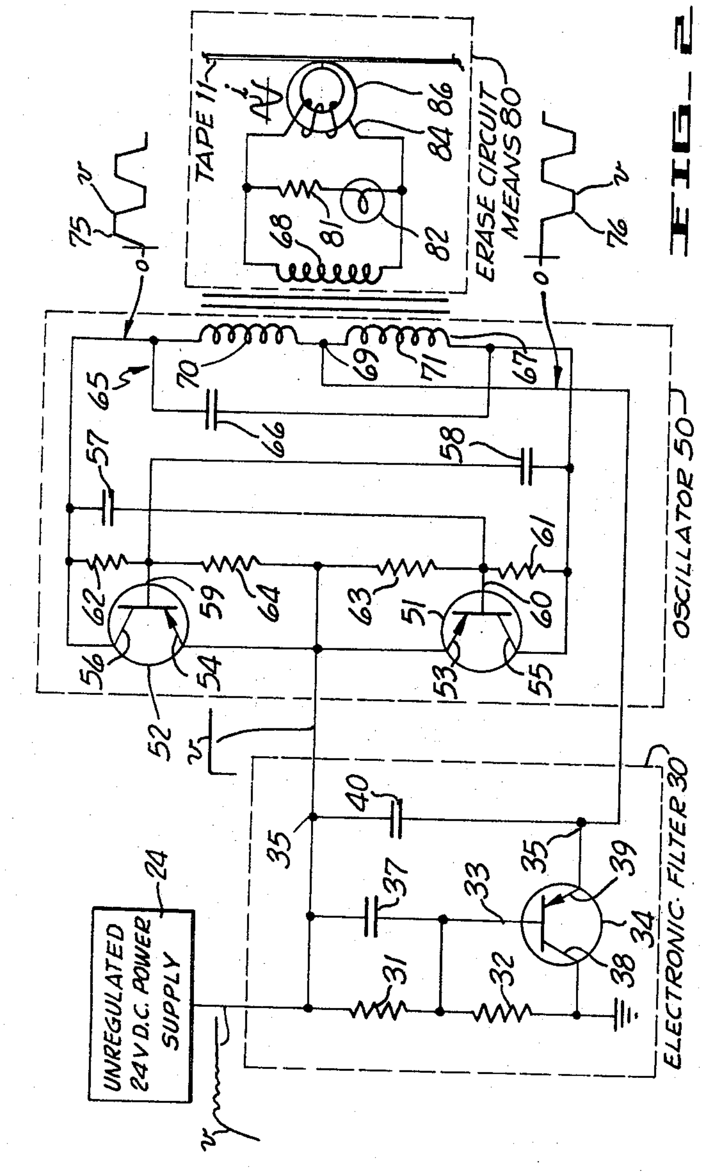

presently known erase head current supply circuit employ vacuum tube components that are actuated via a relay arrangement. The relay arrangement in vacuum tube circuits is necessary to provide the 250 volts commonly necessary to energize such circuits. The vacuum tube systems include an oscillator circuit which is connected to a phase splitting circuit that in turn drives a push-pull amplifier inductively coupled to the erase head. The use of the relay actuated vacuum tube arrangement provides a slow response, utilizes excessive power and involves excessive maintenance as a result of wear and breakdown of the relay mechanism. In addition the use of vacuum tubes requires more space than a solid state circuit, it entails more weight and heat than solid state circuit and it is decidedly more complex. The vacuum tube circuit and its complexity result in inefficiency, higher initial costs, and higher operating cost. It is also difficult to incorporate self-adjusting features and temperature compensation into such systems.

To overcome the above-mentioned shortcomings of the relay-vacuum tube current supply circuit applicants have invented a circuit comprising a solid state oscillator circuit means or solid state master oscillator power amplifier means supplied by an electronic filter or series regulator circuit means that substantially eliminates the ripple or alternating current component present in the unregulated record power supply. The removal of this AC component from the record power supply prevents the transmission of a ripple signal through the oscillator circuit means to the erase head. The transmission of such a signal would result in the erase head recording a signal thereby deteriorating the erasing process.

The electronic filter circuit means and the oscillator circuit means of this invention may be constructed from solid state components such as transistors which may be energized from a 24 volt supply that is readily available in the recorder. This eliminates the need for any relays or additional power supplies. The entire invented circuit uses a total of three solid state elements. When the detailed description is read in conjunction with the drawings it will be seen that the invented circuit is a decided simplification of prior art erase head current supplies, and that the invented circuit is efficient, reliable and inexpensive in comparison with the prior art erase head current supplies.

It is the general object of this invention to provide an improved current supply;

Another object of this invention is to provide an improved erase head current supply;

Another object of this invention is to provide an erase head current supply which is efficient, ecomonical, reliable and simple;

Another object of this invention is to provide an erase head current supply which produces an output signal with substantially all of the ripple signal eliminated;

Another object of this invention is to provide an erase head current supply utilizing a solid state electronic filter and a solid state oscillator having a minimum of elements.

Figure 1:
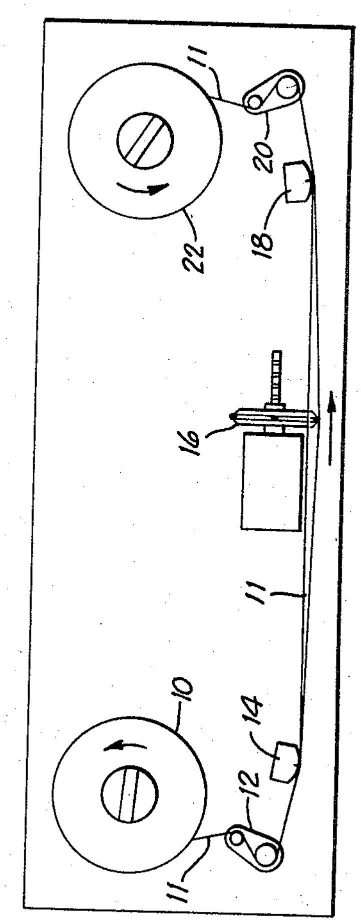

These and other objects and advantages will be fully appreciated and understood when the detailed written description is read in conjunction with the drawings wherein:

FIGURE 1 is a schematic representation of a conventional magnetic recorder tape transport; and FIGURE 2 is a schematic electrical circuit diagram showing the invented erase head current supply circuit.

The invented erase head current supply circuit may be utilized with any of the many well known recorders such as the one schematically shown in FIGURE 1. The recorder shown in FIGURE 1 generally comprises a supply reel 10 having the tape 11 threaded through a tensioning device 12 and in intimate contact with the erase head 14, the record head 16 and the audio head 18. The tape 11 is threaded through the tensioning device 20 to the takeup reel 22 where it is accumulated or stored as the recording process progresses. This arrangement of elements is conventional and does not form an important part of this invention but is shown merely for environmental purposes, that is, to place the invention in the proper environment.

The more important aspects of the invention as shown in FIGURE 2 wherein an electronic filter or series regulator circuit means 30 is connected to energize an oscillator circuit 50 which in turn is connected to the erase head means 80. The electronic filter 30 is connected to a power supply 24 which may be an unregulated 24 volt DC supply having a 120 cycle per second ripple in its output voltage. Such an unregulated power supply is commonly available in magnetic recorders.

The unregulated voltage is supplied to a voltage divider circuit or bias circuit means comprising resistors 31 and 32. The resistor 31 is selected so that the voltage applied to the base 33 of a P-N-P transistor 34 is essentially the same voltage as the voltage that is to be applied at the output terminals 35 of the electronic filter circuit 30. A filter capacitor 37 is connected in parallel with the resistor 31 and is connected in circuit with the base 33 of the transistor 34. The collector 38 of the transistor 34 is connected to ground as is the resistor 32. The emitter 39 of the transistor 34 is connected to one of the output terminals 35 which in turn in connected to a swamping capacitor 40 that bridges the output terminals 35. The swamping capacitor 40 suppresses any tendency of the other components of the electronic filter circuit to oscillate, that is, the swamping capacitor functions to add sufficient capacitance to the electronic filter circuit to prevent any possibility of resonant oscillation.

Typically the electronic filter circuit may be constructed from the following elements.

| Elements: | Values of the elements |
|---|---|
| Resistor **31** | 680 ohms, 5%, two watt. |
| Resistor **32** | 160 ohms, 5%, two watt. |
| Capacitor **37** | 250 microfarads, 50 volts. |
| Capacitor **40** | 100 microfarads, 50 volts. |
| Transistor **34** | 2N1544. |

In operation the filter capacitor 37 and the transistor 34 along with its associated biasing network 31 and 32 cooperate to provide a filter network that is equivalent to a half-section filter having an effective capacitance equal to the capacitance of capacitor 37 multiplied by the current gain of the transistor 34. This increase of the effective capacitance provides a low impedance path to ground for any ripple that may appear in the unregulated power supply thereby effectively filtering the supply power and providing a substantially constant voltage at the output terminals 35. To provide the same capacitance with an electrolytic capacitor would result in a large and unreliable arrangement. Electronic filters such as this one are considered in "Motorola Power Transistor Handbook" published by Motorola Company (1960), page 154.

The output terminal 35 of the electronic filter circuit 30 are connected to the oscillator circuit 50. This circuit 50 may be designated a push-pull oscillator means, a DC-AC inverter means, or a master oscillator power amplifier means. The oscillator circuit 50 comprises a pair of P-N-P transistors 51 and 52 having their emitters 53 and 54 connected to one of the output terminals 35 of the electronic filter circuit 30. The transistors 51 and 52 have their collectors 55 and 56 cross-coupled to the other transistor's base circuit 59 and 60, respectively, by the capacitors 58 and 57. This cross-coupling by the capacitors 57 and 58 forms a positive feedback connection between the transistors 51 and 52, that is, as the collector 55 of the transistor 51 increases its conduction the base 59 of the transistor 52 is made more positive and is maintained in the nonconductive state. Subsequently when the transistor 51 reaches saturation the transistor 52 becomes conductive and its coupling capacitor 57 applies a more positive bias or potential to the base circuit 60 of the transistor 51 thereby placing that transistor in a nonconductive state.

The collectors 55 and 56 and the bases 60 and 59 are interconnected by forward biasing resistors 61 and 62. These resistors contribute to the establishment of a proper bias relationship between the emitter and the base of the transistors. The emitters 53 and 54 are connected to bases 60 and 59, respectively, by temperature compensating resistors 63 and 64. These resistors 63 and 64 form a low impedance path which serves to limit the effect of the leakage current flowing in the base-collector circuit thereby reducing the possibility of thermal runaway.

The rate at which the transistors 51 and 52 switch from a conductive to a nonconductive state is largely determined by a tank circuit 65 which includes capacitor 66, transformer primary 67 and the impedance reflected from the transformer secondary 68 and its associated circuitry. The transformer primary 67 has a center tap 69 which is connected to one of the input terminals 35. The center tap 69 divides the transformer primary 67 into a first transformer portion 70 and a second transformer portion 71. The first transformer portion 70 is directly connected to the coupling capacitor 57 while the second transformer portion 71 is directly connected to the coupling capacitor 58. The manner in which the coupling capacitors 57 and 58 are charged is largely determined by the parameters of the tank circuit 65 and it is the natural frequency of this tank circuit that primarily determines the rate of oscillation of the oscillator circuit 50.

Typically the oscillator circuit 50 described above may be constructed from the following elements.

| Elements: | Values of the elements |
|---|---|
| Transistors 51 and 52 | 2N1546. |
| Resistors 61 and 62 | 22K ohm resistors, 5%, ½ watt. |
| Resistors 63 and 64 | 240 ohms, 5%, two watts. |
| Capacitors 57 and 58 | .1 microfarad, 100 volt, 5% (Mylar). |
| Capacitor 66 | .047 microfarad, 400 volt, 10% (Mylar). |
| Transformer (67 and 68) | 10 to 1 turns ratio, center tap transformer with ferrite core. |

In operation the oscillator circuit has a constant voltage input supplied to it by the electronic filter circuit 30. This input is inverted to a distorted square wave by the alternate conduction and nonconduction of the transistors 51 and 52. The transistors 51 and 52 operate in a push-pull fashion with the waveforms generated being shown at 75 and 76. This distorted square wave is transmitted to the first portion of the transformer 70 and the second portion of the transformer 71, respectively. The voltage output of the transistors 51 and 52 are out of phase by 180°. These out of phase distorted square waves are combined in the transformer 67 to transmit a substantially continuous distorted square wave to the transformer secondary 68. Typically the resultant wave oscillates at 100 kc. with an amplitude of 60 volts. It should be noted that the oscillator circuit means 50 serves to amplify, oscillate or invert, and shape the constant voltage input.

The head circuit means 80 comprises the transformer secondary 68 which has a resistor 81 and a tally or indicator lamp 82 connected across it in a parallel relationship. A head energizing coil 84 is connected in parallel with the resistor 81 and the tally lamp 82. When the coil 84 is energized a flux is produced in the head 86 and the tally lamp 82 is energized to indicate that the erase head is being driven. The flux induced in the head 86 is utilized to erase any signal that might be recorded on the tape 11. It can be seen that the erase circuit means 80 is an inductive circuit. This fact results in an impedance being reflected into the tank circuit 65 which enables the attainment of the desired 100 kc. oscillating frequency. The inductive nature of the erase circuit means causes a sinusoidal current waveform to be generated through the energizing coil 84. The sinusoidal 100 kc. current waveform results in a flux passing through the magnetic head 86 which can effectively erase the tape 11.

In summary the invented erase head current supply circuit comprises an electronic filter circuit which removes any ripple from the unregulated record power supply and supplies the regulated voltage to an oscillator circuit means. The oscillator circuit operates in a push-pull fashion to supply a 100 kc. energizing voltage to the head circuit means. The head circuit means derives a 100 kc. sinusoidal current from the energizing voltage of the oscillator circuit means. The 100 kc. current energizes the magnetic erase head which effectively erases the tape. This combination of circuit components provides a relatively simple, economical, reliable and effective erase head supply circuit or assembly. The invented circuit has reduced power requirements by 50% and reduced costs of manufacture by a factor of about 3.

While the above detailed description has shown, described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

An erase head current supply circuit for providing an alternating erase current to a magnetic erase head disposed against a magnetic recording medium, wherein said current supply circuit is energized by an unregulated voltage supply means having an output voltage with a ripple component, the combination comprising:

a solid state electronic filter operatively coupled to said unregulated voltage supply means for removing the ripple component from said output voltage and for transmitting a substantially constant output voltage;

said electronic filter comprising a transistor having base, collector and emitter electrodes, a capacitor and a biasing resistor circuit, wherein the capacitor is connected in series with said base electrode, the collector is connected to ground and the resistor is connected in part across the capacitor and in part from the base electrode to ground to define a filter circuit having an effective filter capacitance equal to the capacitance of the capacitor multiplied by the current gain of said transistor;

solid state amplifier oscillator means including a transformer primary, operatively coupled to said electronic filter means for forming an alternating current output signal; and erase head circuit means defining an essentially pure inductance circuit operatively coupled to said amplifier oscillator means, wherein the inductance of the erase head circuit means is of a value to enable said solid state amplifier oscillator means to oscillate at frequencies greater than 50 kilocycles per second and the head current to define an essentially pure sinusoidal waveform, said erase head circuit means including a transformer secondary coupled to the transformer primary and connected directly across an erase head driving coil to generate said essentially pure sinusoidal current in the driving coil to effectively reduce any flux in the medium to a zero value, and including a tally light coupled across the head winding to indicate the success of the erase process.

References Cited

UNITED STATES PATENTS 3,038,036 6/1962 Young ............ 179—100.2

OTHER REFERENCES

E. F. Doronkin: Self Extraction Modes in a Symmetrical Transistor Multivibrator, Electronics Express, September 1960, pp. 14, 15, 16.

L. P. Hunter: Handbook of Semiconductor Electronics, 1962, pp. 17–18, 17–19, 17–20.

BERNARD KONICK, *Primary Examiner.*

R. R. SNIDER, *Assistant Examiner.*